July 26, 1960
S. KARPCHUK
2,946,218
TUNABLE PICK-UP
Original Filed Dec. 17, 1954
3 Sheets-Sheet 1
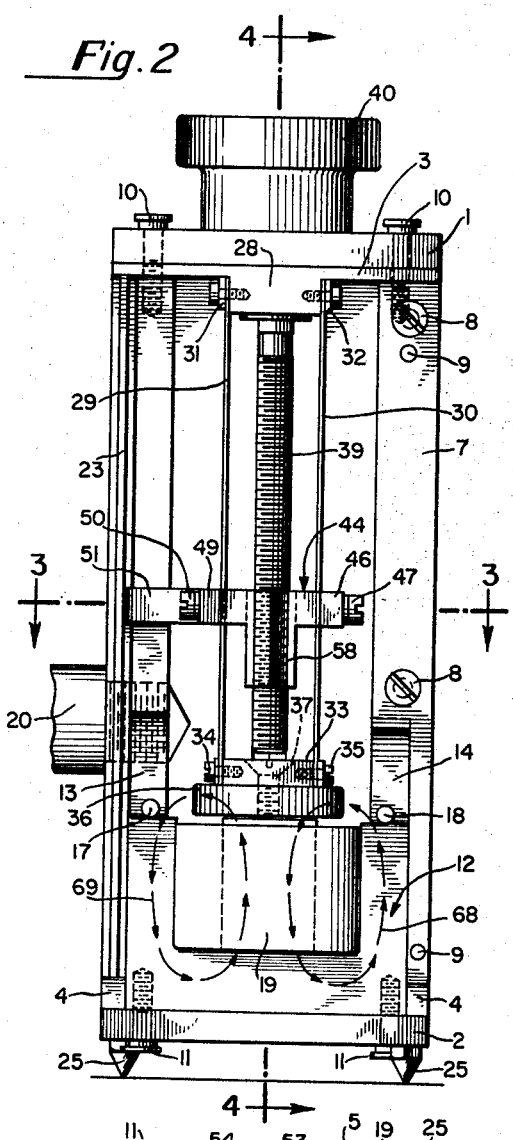
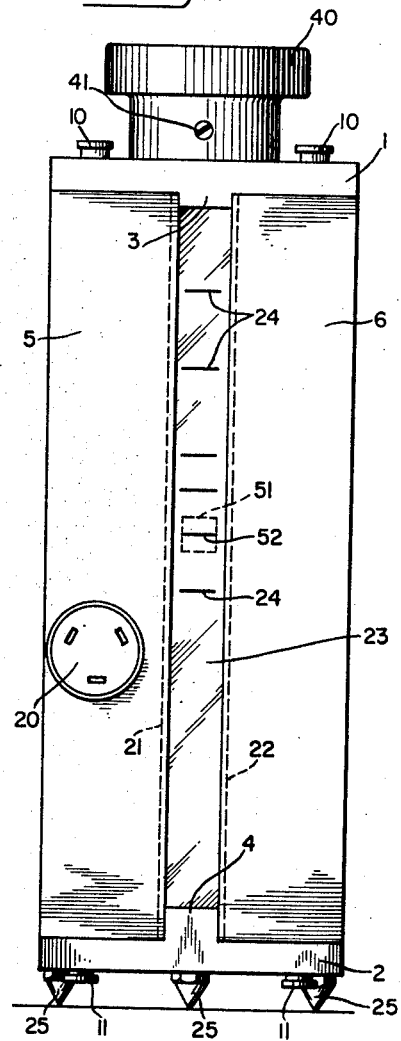
INVENTOR.
Sylvester Karpchuk
BY
Synnestvedt & Lechner
ATTORNEYS July 26, 1960  S. KARPCHUK  2,946,218
TUNABLE PICK-UP
Original Filed Dec. 17, 1954  3 Sheets-Sheet 2
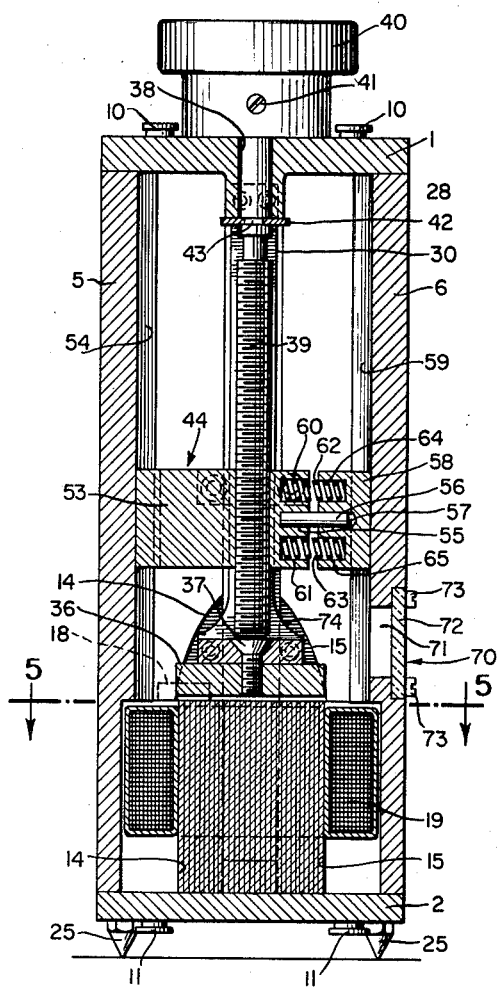
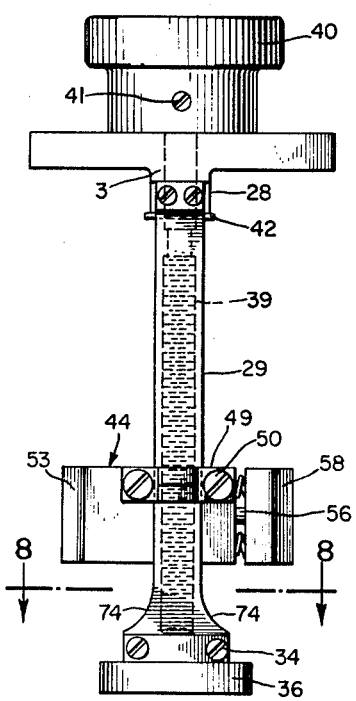
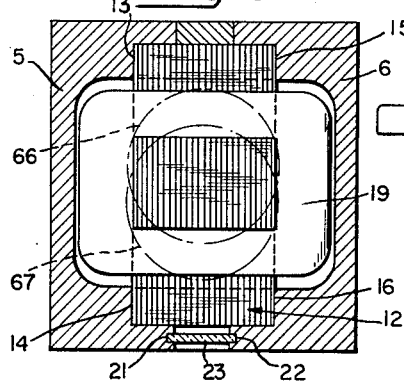
INVENTOR.
Sylvester Karpchuk
BY
Synnestvedt & Lechner
ATTORNEYS July 26, 1960

S. KARPCHUK 2,946,218

TUNABLE PICK-UP

Original Filed Dec. 17, 1954

INVENTOR.
Sylvester Karpchuk
BY
Synnestvedt & Lechner
ATTORNEYS

United States Patent Office 2,946,218
Patented July 26, 1960

2,946,218
TUNABLE PICK-UP

Sylvester Karpchuk, Philadelphia, Pa., assignor to Tinius Olsen Testing Machine Company, Willow Grove, Pa., a corporation of Pennsylvania Original application Dec. 17, 1954, Ser. No. 476,025. Divided and this application Mar. 12, 1956, Ser. No. 570,960

5 Claims. (Cl. 73—70.2)

This invention relates to vibration pick-ups and, in particular, relates to a tunable vibration pick-up which is ideally suited for use with balancing machine equipment and with vibration analysis equipment.

This application is a division of my copending application Serial No. 476,025, filed December 17, 1954.

Certain types of balancing machines, for example, a machine to determine the amount and location of unbalance in a crankshaft, comprise, in general, a cradle which is supported by elastic members such as rods or springs or the like. The cradle has means for rotatably supporting a crankshaft and the unbalance in the rotating shaft causes the cradle to oscillate, the oscillation or vibration being restrained by the elastic members. The elastic members may be provided with means such that the cradle can be tuned to the rotational speed of the shaft for the purpose of obtaining maximum deflection for a given amount of unbalance and for filtering out external vibrations such as floor noise, or the spring members may be constructed or permanently tuned such that the cradle has a low natural frequency, and this provides filtering for external vibrations. A pick-up generally comprising a relatively movable permanent magnet and coil is used to generate an unbalance signal. The coil is ordinarily mounted on the cradle while the permanent magnet is mounted on a bracket adjacent the cradle.

One disadvantage of the above arrangement is that floor noise or the like may cause relative motion between the stand on which the permanent magnet is mounted and the cradle on which the coil is mounted. Thus, the pick-up will not produce a true unbalance signal.

Another disadvantage of such a machine is that floor noise having a frequency at or near the tuned frequency may cause the cradle to vibrate. Since this is the resonant frequency, the cradle vibration may be of considerable magnitude and the pick-up signal will accordingly be in error.

Another disadvantage is that in such machines the pick-ups are not tunable; hence, there is provided only a single source of mechanical filtering, i.e., in the supporting structure of the cradle itself.

One of the principal objects of the present invention is to provide a pick-up for the above type of balancing machine which will eliminate the mentioned disadvantages.

The pick-up of the invention, when mounted on the cradle, is self-contained, i.e., it has no mechanical connections external to the cradle. Thus, errors inherent in the ordinary type of pick-up due to relative motion between an external bracket and the cradle are positively eliminated.

Preferably, the pick-up, as mounted on the cradle, is tuned substantially to the frequency of the rotating crankshaft or other test article which may rotate at 1000 to 2000 r.p.m. The cradle is de-tuned or constructed such that it can only respond or vibrate to floor noise frequencies of a very low order of magnitude, for example, 100 c.p.s. or less. Thus, the cradle will not be vibrated by floor noise having a frequency in the order of the frequency of the rotating part being tested and furthermore, because the pick-up itself is tuned, it will not respond to lower order frequencies in the event these are not filtered out by the cradle. Two mechanical filtering systems are provided which clearly is of great advantage in balancing equipment where an error-free signal from the pick-up is of paramount importance.

While it is preferable that the cradle be de-tuned as above-mentioned, there are many instances, particularly where floor noise vibrations are of a frequency very much different than the frequency of the rotating test article, where both the cradle and the pick-up can be tuned to the frequency of the rotating part so that the unbalance signal will be of a very high order of magnitude. This arrangement is particularly important where the amount of unbalance in the article under test is small.

Aside from use in conjunction with balancing equipment my device is particularly suitable in vibration analysis work.

In addition to use with balancing machines as above mentioned, the invention here is ideally suitable for use with portable type balancing equipment such as disclosed in co-pending application Ser. No. 634,459, filed January 16, 1957, now abandoned, entitled, Balancing Methods and Equipment and assigned to the same assignee of the present invention.

For example, where a machine has several rotating or moving parts any one of which could be a major source of vibration of an undesirable frequency, the device may be consecutively placed on the supports or housings of the parts and by tuning, the part producing the undesired frequency is quickly located. For tuning, a control knob is actuated while a vibrating element is observed through a window. The knob moves a pointer over a properly calibrated scale and when the element has maximum vibration, the operator merely has to read the scale to obtain the frequency. I have found that the sensitivity of the device is such that at the tuned or resonant frequency, the magnitude of vibration is very great, whereas, on either side of the resonant frequency, the magnitude decreases appreciably. Thus, relatively accurate results may be obtained by merely observing the vibrating element. Where highly accurate frequency information is required, a meter may be coupled to the pick-up and the device tuned until the meter needle reads a maximum.

The manner in which the invention is constructed will be readily apparent from the following description and drawings wherein:

Figure 1 is an elevational front view of the pick-up;

Figure 2 is an elevational side view looking toward the left in Figure 1 with the right-hand side member of Figure 1 removed;

Figure 3 is a sectional view taken along the lines 3—3 of Figure 2;

Figure 4 is a sectional elevational view taken along the lines 4—4 of Figure 2;

Figure 5 is a view taken along the lines 5—5 of Figure 4;

Figure 6 is a fragmentary view of certain of the components of Figure 4;

Figure 7 is a fragmentary view of a bracket by means of which the device may be permanently attached to a cradle of a balancing machine or the like;

Figure 8 is a view taken along the lines 8—8 of Figure 6;

Figure 9:
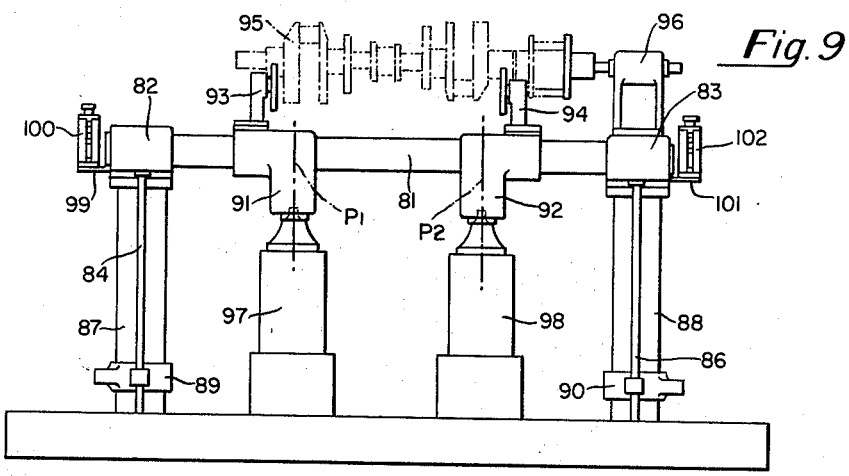
Figure 9 is an elevational view showing the pick-up of the invention as applied to one type of balancing machine.

Figure 1 illustrates a front view of my device and it will be seen that the housing comprises a top cap 1 and a bottom cap 2 both of which are generally rectangular in shape. The top cap 1 is provided with a longitudinally extending ledge 3 and the bottom cap 2 is provided with upstanding lugs 4. The left and right side members 5 and 6 bear against the ledge 3 at the top and against the lugs 4 at the bottom. As seen in Figure 3, both of these side members are generally U-shaped and are spaced apart by a spacer 7 which is secured to the left side member 5 as by screws 8—8 and locating pins 9—9 (see Figure 2). The side members are fixed to the top and bottom caps respectively by the screws 10—10 and 11—11.

Both of the side members are provided with undercuts which locate an E-shaped core 12. The undercuts in the left side member are indicated at 13 and 14 in Figure 2, the undercut 14 also being shown in Figure 4. The right side member is provided with undercuts 15 and 16, the undercut 15 being best seen in Figure 4. As will be apparent from an inspection of Figure 3, these undercuts form a generally rectangular aperture which holds the core 12. The undercuts 13 and 14 have pins 17 and 18 which prevent the core from moving upwardly. As best seen in Figure 4, the core is adapted to be held firmly against these pins by the bottom cap 2.

As best seen in Figures 3 and 5, the center leg of the core 12 has a coil 19, the two leads of which (not shown) may be brought to the outside of the device by means of the connector 20 mounted in the left side member 5. As seen in Figure 3, the left and right side members are respectively provided with slots 21 and 22 which mount a transparent plate 23 provided with indicia 24 as indicated in Figure 1. The plate and indicia, of course, form a scale which may be calibrated in terms of speed or frequency or the like.

The bottom cap 2 is provided with three cone-shaped mounts 25—25 which are preferably arranged in the form of a triangle. The cone-shaped mounts provide for the device to be placed on a member to be tested and, by using slight hand pressure, may be firmly held thereto. Where the device is to be permanently attached, the cap 2 may be replaced by a similar cap 26 (Figure 7) which is provided with mounting arms 27—27.

As seen in Figures 2 and 4, the ledge 3 on the top cap is provided with a downwardly extending portion 28 to which is secured the reeds or springs 29 and 30 by means of the plate screw assemblies 31 and 32. At the bottom, each spring is secured to a spacer 33 by means of the plate screw assemblies 34 and 35, the spacer being fixed to a permanent magnet 36 by means of the screw 37. As seen in Figure 3, the magnet 36 is circular in shape, although the magnet may be rectangular or any other convenient shape.

As seen in Figure 3, the springs 29 and 30 are strip-like in form, rectangular in cross section and arranged so that wide faces thereof are generally parallel one another.

As seen in Figure 4, the top cap is provided with an aperture 38 in which is mounted a screw 39. The screw extends outwardly and carries a knob 40 which may be secured thereto as by the set screw 41. The screw is held in position by means of the snap washer 42 disposed in a slot 43 in the shaft and bearing against the portion 28.

As seen in Figure 2, the screw carries a T-shaped control member or nut 44 which is adapted to move upwardly and downwardly as the screw is rotated by the knob 40.

As seen in Figure 3, the back end of the T is provided with a groove 45 which receives the spring 30, the spring being held in the groove by the plate 46 secured to the T by the screws 47. The front side of the T is provided with a groove 48 in which is disposed the spring 29 and is held in the groove by means of the plate 49 secured to the T by the screws 50. The arrangement is such that the nut may be moved upwardly and downwardly with respect to the springs. The plate 49 has a forwardly extending portion 51 which, as seen in Figure 1, carries an index line 52. As will be apparent, when the control knob 40 is actuated to move the nut up or down, the index line 52 will run along under the indicia 24.

The nut 44 is held against rotation by means of the arrangement described following. As seen in Figure 3, the T has a V-shaped extension 53 which mates with a V-shaped groove 54 in the left side member 5. On the right-hand side, the T has an aperture 55 which carries a pin 56 disposed in an aperture 57 in the V-shaped member 58 which is adapted to mate with a V-shaped groove 59 in the right side member 6. The T also has upper and lower apertures 60 and 61 (Figure 4) which carry springs 62 and 63 respectively disposed in apertures 64 and 65 of the V-shaped member 58. The springs force the V-shaped member firmly against the right side member 6.

As will be apparent from the foregoing description, the control member or nut 44 and the screw 49 are rigid in the direction of vibration of the springs.

The theory of operation of the device is explained following. The device is held against a vibrating member or permanently attached thereto as mentioned above. The vibrations cause the springs 29 and 30 to move forward and backward and the permanent magnet 36 vibrates back and forth over the coil 19. An extreme position of the magnet during very low vibration is indicated by the circular dotted lines 66 and 67 in Figure 5. When the magnet is in the position shown by the dotted lines 66, a flux path is established which may be in the direction shown by the dotted lines 68 in Figure 2. When the magnet is in the position of the dotted lines 67, a flux path indicated by the dotted lines 69 in Figure 1 may be established. It will be observed that the flux paths are in opposite directions. Thus, a signal will be generated in the coil 19 which is approximately that of a sine wave. The frequency of this signal will, of course, be the frequency with which the magnet or springs vibrate. By turning the control knob, the resonant frequency of the springs and magnet may be changed.

By using two strip-like springs arranged parallel to each other several highly important advantages are gained: (1) the form of the sine wave is greatly improved; (2) sources of spurious components are eliminated; (3) the pick-up is more direction sensitive. In other words, the two springs provide: (a) that the locus of relative motion between the magnet and the coils is practically harmonic, hence a signal that is practically a sine wave; (b) that there is no tendency for the magnet to flutter, whip or oscillate about its point of connection with the springs, thus eliminating spurious components due to faulty relative movement; and (c) that the locus of relative motion between the magnet and the coil is straight line rather than extended oval which makes the pick-up more direction sensitive and also eliminates a source of spurious components.

In using the device for vibration testing, the movement of the magnet may be observed through transparent member 23 or one of the sides may be provided with a viewing window. In Figure 4 I have shown the right side member to have a viewing window 70 which comprises a generally rectangular-shaped aperture 71 having a transparent plate 72 held thereon as by screws 73—73. By holding the device on the piece under test, the vibrations of the magnet may be observed, and by moving the control knob until maximum deflection is observed, the frequency of the part is obtained. This frequency is read on the scale. Where very great accuracy is required, the device may be coupled with a meter and operated as disclosed in the above-mentioned copending application Serial No. 634,459.

From an inspection of Figure 6, it will be seen that the bottom portions of the springs are somewhat flared, as is indicated at 74—74. I have found this arrangement to be particularly suitable because there is virtually no tendency for the springs to fracture at this point, which may be the case where no flare is provided.

Figure 10:
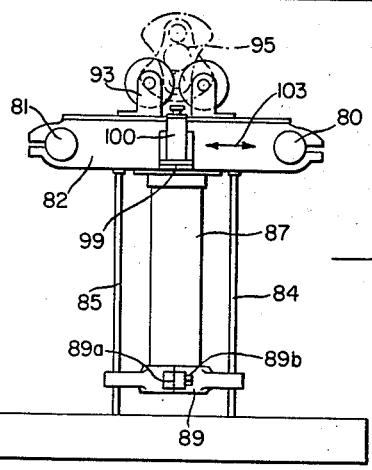
Figure 10 is a view looking toward the right in Figure 9.

In Figures 9 and 10 I have illustrated a manner in which the pick-ups of the invention are used with a typical balancing machine. The cradle of the machine comprises two longitudinally extending tubes 80 and 81 which are held together at their respective ends as by cross members 82 and 83. The cross member 82 is supported by elastic rods 84 and 85 and the cross member 83 is similarly supported by a pair of rods, one of which is indicated at 86. Beneath each of the members 82 and 83 is disposed cylindrical members 87 and 88, each of which contains oil, and paddles (not shown) extend down from each of the members 82 and 83 into the oil. This serves as a damping arrangement for the cradle.

On cylindrical member 87 is mounted a tuner 89 which slidably engages each of the elastic rods 84 and 85. The tuner is split, as indicated at 89a, and may be tightened or loosened on the member 87 by means of the screw 89b and so is adjustable in a vertical direction. A similar tuner 90 is mounted on the cylindrical member 88 and engages the pair of elastic rods at that end. By suitably moving the tuners 89 and 90 in a vertical direction, the cradle may be tuned to a desired natural frequency.

The rods 80 and 81 carry brackets 91 and 92 which respectively have supports 93 and 94 mounted thereon. The supports 93 and 94 rotatably mount a crankshaft 95. The crankshaft is adapted to be rotated through the mechanism generally indicated by the numeral 96, which is secured to some external driving means.

The pivots 97 and 98 are adapted to be alternatively engageable with the members 91 and 92 so that unbalance may be determined in each of the correction planes P–1 and P–2 indicated by the dotted lines. The pivots may be operated as shown in copending application Serial No. 233,294 of oJhn Reed Stovall, Jr. et. al., filed June 25, 1951, now Patent No. 2,783,648, or in application Serial No. 260,957 of John Reed Stovall, Jr. et al., filed December 11, 1951, now Patent No. 2,779,217, both of said patents being assigned to the assignee of the present invention.

The member 82 carries a bracket 99 on which is fixedly secured my pick-up device 100. The member 83 also carries a bracket 101, to which is secured another pick-up device 102.

When pivot 98 is engaged and the crankshaft rotated, the unbalance will cause the cradle to vibrate about this pivot generally in a direction as indicated by the arrows 103 in Figure 10. This will cause my device 100 to vibrate and a signal will be generated which is proportional to the amount of unbalance. When the pivot 98 is disengaged and the pivot 97 engaged, my pick-up device 102 is used to generate a signal in accordance with the amount of unbalance in the right correction plane. A typical circuit for determining unbalance with which my pick-up may be used is shown in previously mentioned Patent No. 2,783,648.

In the preferred manner of operation, the tuners 89 and 90 are adjusted such that the cradle has a low natural period of vibration, say, 100 c.p.s. or less, and the control knobs on the pick-ups are adjusted such that each pick-up is tuned to the frequency of the rotating shaft or other part to be tested. Ordinarily, the speed of rotation of the test piece may be in the order of 1000 to 2000 r.p.m. In many instances, however, both the cradle and the pick-ups can be tuned to the frequency of the object under test and in this manner, the signal response from the pick-up is greatest for a given amount of unbalance.

It will be apparent that certain of the advantages of the invention may be realized even though the pick-up is not tuned to the rotational frequency of the part under test. For example, where a large number of the same kind of parts is to be tested, ordinarily a pick-up may be used which has a natural frequency corresponding to the rotational frequency of the part to be tested. However, for reasons well known to those skilled in the art, the rotational speed of the part to be tested may be changed. In such event, the pick-up, of course, will still produce a signal, however, the magnitude may be somewhat smaller, depending upon the particular change in speed. The basic requirement in such an arrangement is that the pick-up produce a signal within the unbalance tolerance and that this signal be of an order of magnitude which is usable.

While I have shown the pick-ups of the invention as used with a pivot-type cradle, it will be apparent that the device may be used with a cradle where vibration takes place simultaneously in both correction planes and both pick-ups generate signals. In such instance, the signals generated are fed to a circuit which selects the required component.

Figure 11:
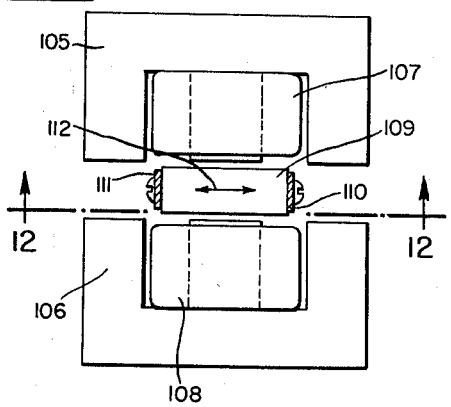
Figure 11 is a plan view of an alternative arrangement for certain components of the invention.
Figure 12:
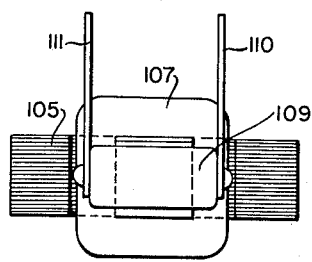
Figure 12 is a view taken along the lines 12—12 of Figure 11.

In Figures 11 and 12 I have shown another arrangement for the core, coil and magnet of my pick-up. In the embodiment previously described, I have noticed some tendency with frequencies in the order of 500 cycles and below for the pull exerted by the magnet against the core to introduce some error in the vibrating frequency. The arrangement described below reduces the effect of any pull between the magnet and the core to a point where the same has no effect on the accuracy of the vibration at the lower frequencies.

The alternative arrangement comprises two E-shaped cores 105 and 106 which are mounted face-to-face. The center leg of each core has coils indicated by the numerals 107 and 108, which are electrically connected in series adding. Interjacent the coils is mounted a permanent magnet 109 suspended on the springs 110 and 111. The magnet is adapted to swing back and forth as indicated by the arrows 112. As the magnet moves, say, towards the right, voltages of the same phase and magnitude are generated in each coil and as the magnet swings in the left-hand direction, voltages are generated in the coils which are in phase with one another but opposite in phase to that generated when the magnet is in the right-hand position.

I claim:

1. For balancing equipment, a tunable pick-up comprising: an elongated housing; two elongated strip-like springs arranged with their broad sides facing and generally parallel one another and one end of each being fixed to one end of said housing; a permanent magnet fixed to the other ends of said springs; a control member mounted in the housing and having portions surrounding said springs in sliding engagement therewith; means connected to said housing and to said control member for moving the control member back and forth along said springs so that the effective vibrating length of each spring may be changed and said control member and said means being rigid in the direction of spring vibration; and core and coil assemblies mounted in said housing adjacent said magnet, the coil being adapted to develop an electrical signal when there is relative motion between the coil and the magnet.

2. A construction in accordance with claim 1 wherein the core is E-shaped, the coil assembly is disposed about the center leg thereof, and the legs of the E face generally parallel to the longitudinal axis of said springs.

3. A construction in accordance with claim 1 wherein there are two E-shaped cores, the respective legs of the same facing but spaced from each other and the coil assembly is wound around the center legs of each, the cores being disposed so that said magnet can vibrate therebetween.

4. For balancing equipment, a tunable pick-up comprising: an elongated housing adapted in use to be disposed in an upright position; a pair of V-shaped grooves inside said housing; an elongated transparent window in said housing and having indicia representing calibrations thereon; a pair of spaced strip-like springs arranged with their broad sides facing and generally parallel one another and one end of each being supported on the top of said housing; a screw rotatably supported in the top of said housing and extending downwardly between said springs; a nut on said screw, the nut having a pair of slots respectively slidingly engaging said springs and having a portion disposed adjacent said window and carrying an index line viewable through the window; a pair of V-shaped members extending from said nut and cooperating with said V-shaped grooves to prevent turning of the nut when said screw is rotated and said nut and said screw being rigid in the direction of spring vibration; a rotatable knob on said housing connected with said screw, the knob being adapted to cause rotation of the screw and thereby displace the nut along said springs so that the effective vibrating length of each spring may be changed; a permanent magnet secured to the lower ends of said springs; and core and coil assemblies disposed adjacent said magnet, the coil being adapted to develop an electrical signal when there is relative motion between the coil and the permanent magnet.

5. In a tunable pick-up: a housing; a pair of flat elongated strip-like springs arranged with their broad sides facing and generally parallel one another and one end of each spring being fixed to said housing; a permanent magnet interconnecting the other ends of said springs and providing a mass to effect vibration of the springs; a control member slidably engaging each of said springs and movable therealong to vary the effective vibrating lengths thereof; means connected to the control member and to the housing for moving the control member and providing for the control member to be rigid in the direction of spring vibration; and coil means connected with said housing and disposed adjacent said magnet for developing an electrical signal with relative motion between the coil and magnet.

References Cited in the file of this patent
UNITED STATES PATENTS

| | | |
|---|---|---|
| 1,687,507 | Perkins | Oct. 16, 1928 |
| 1,948,104 | Firestone et al. | Feb. 20, 1934 |
| 2,359,245 | Ritzmann | Sept. 26, 1944 |
| 2,429,094 | Kent et al. | Oct. 14, 1947 |
| 2,552,722 | King | May 15, 1951 |
| 2,595,067 | Flint | Apr. 29, 1952 |
| 2,817,971 | Gruber | Dec. 31, 1957 |

OTHER REFERENCES

Publication, Instrument Practice, Oct. 1953, pp. 969–971.